United States Patent
Gomes et al.

(10) Patent No.: US 9,989,130 B2
(45) Date of Patent: Jun. 5, 2018

(54) COMPRESSION LIMITER RETENTION FOR A CHAIN GUIDE

(71) Applicant: Schaeffler Technologies AG & Co. KG, Herzogenaurach (DE)

(72) Inventors: Gustavo Gomes, Troy, MI (US); Lucian Botez, Novi, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 174 days.

(21) Appl. No.: 15/147,088

(22) Filed: May 5, 2016

(65) Prior Publication Data

US 2017/0321786 A1 Nov. 9, 2017

(51) Int. Cl.
*F16H 7/18* (2006.01)

(52) U.S. Cl.
CPC .................. *F16H 7/18* (2013.01)

(58) Field of Classification Search
CPC ...... F16H 2007/0872; F16H 7/18; F16H 7/08; F16H 2007/0804; F02B 2275/18
USPC .......................................... 474/140
See application file for complete search history.

(56) References Cited

U.S. PATENT DOCUMENTS

| | | | | |
|---|---|---|---|---|
| 5,665,019 A | * | 9/1997 | Sheffer | F16H 7/08 474/111 |
| 5,846,150 A | * | 12/1998 | Wigsten | F16H 7/18 474/111 |
| 6,120,403 A | * | 9/2000 | Suzuki | F16C 11/04 474/111 |
| 6,428,435 B1 | * | 8/2002 | Kumakura | F16H 7/08 474/111 |
| 6,572,502 B1 | * | 6/2003 | Young | F16H 7/08 474/111 |
| 7,097,579 B2 | * | 8/2006 | Markley | F16H 7/08 474/101 |
| 2005/0042057 A1 | * | 2/2005 | Konig | F16B 37/043 411/103 |
| 2007/0082774 A1 | * | 4/2007 | Tawarada | F16H 7/18 474/111 |
| 2010/0292037 A1 | * | 11/2010 | Botez | F16H 7/18 474/111 |

* cited by examiner

*Primary Examiner* — Henry Y Liu
(74) *Attorney, Agent, or Firm* — Matthew V. Evans (57) ABSTRACT

A compression limiter retainer arrangement for a plastic chain guide is provided that minimizes the packaging requirements. The plastic chain guide contains an oblong aperture and a round aperture for mounting to an internal combustion engine. At least one radially inward protruding finger is present at each of the longitudinal ends of the oblong aperture to retain a first compression limiter. Additionally, at least one radially inward protruding finger can be placed proximate to the round aperture to retain an optional second compression limiter. The angular position of the radially inward protruding fingers is defined and limited for optimum chain guide packaging and performance.

19 Claims, 9 Drawing Sheets

COMPRESSION LIMITER RETENTION FOR A CHAIN GUIDE

BACKGROUND

The present disclosure relates to a compression limiter retainer arrangement for a plastic component, and more particularly, to a compression retainer arrangement for a plastic chain guide for an internal combustion (IC) engine.

More stringent fuel economy regulations for the transportation industry have prompted the need for improved vehicle efficiencies. Many focused design efforts that contribute to the achievement of future regulatory requirements are in process. Two such efforts are friction reduction and lightweighting, both of which are being scrutinized for many vehicle components. Regarding the IC engine that powers most of today's on-highway vehicles, friction reduction has made large strides in recent years with improvements to many of the rubbing interfaces, including the piston interface with the piston bore (coatings, piston ring tension) and instances where hydrodynamic bearings are being replaced with rolling element bearings (camshafts, balance shafts). Lightweighting involves the process of optimizing the design of a component through finite element analysis (FEA) and can often employ a change in material. In some instances, lightweighting can also lead to friction reduction as weight reduction can lead to dynamic load reduction of a given component, which can facilitate lower loads between rubbing interfaces.

Chain drive systems are often used on an IC engine to drive the camshafts, balance shafts or oil pump. Camshaft drives transmit the rotary motion of the crankshaft at a 2:1 ratio to one or more camshafts in either an overhead valve or overhead camshaft valve configuration. As the camshafts rotate, intake and exhaust valves are opened and closed by lobes on the camshaft that interface with the valve train of the engine. The timing of the intake and exhaust valve events, relative to the location of the piston within the combustion cycle is essential to the function of the engine as is the ability to maintain this precise timing over the lifetime of the engine. Balance shaft drives transmit the rotary motion of the crankshaft typically at either a 1:2 or 1:1 ratio to one or more balance shafts. A balance shaft consists of an eccentric-weighted shaft that, when rotated, imparts a force on the engine to counteract vibrations due to the inherent imbalance of some engine cylinder arrangements. The rotational position of the eccentric weight of the balance shaft with respect to the piston position within the combustion cycle is essential to facilitate a smoother running engine. Oil pump drives transmit the rotary motion of the crankshaft to an oil pump that generates oil pressure for the lubrication system of the engine. In some engines, the oil pump and balance shafts are integrated into a single component which requires only a single drive input from the crankshaft.

The crankshaft of an IC engine is continuously accelerated and decelerated throughout its rotation due to the four strokes of a combustion cycle (intake, compression, power, and exhaust) combined with the firing order of the engine. Given the fact that a chain drive typically derives its rotary power from the crankshaft and that each driven component (camshafts, balance shafts, oil pump) has its own unique load characteristic, a chain drive system must be capable of controlling unique drive system dynamics. Special chain drive components exist to accomplish this task such as a tensioner, tensioner arm and a fixed chain guide. The tensioner arm and fixed chain guide come into direct contact with the chain and are often made of plastic to provide a low friction and low noise interface. In addition, the use of a plastic component instead of a metal component offers significant weight advantages.

The design of the attachment points of a plastic component to an IC engine should allow for: 1). manufacturing tolerances of the plastic component attachment points, 2). manufacturing tolerances of the engine structure attachment points (for example, threaded holes), and 3). environmental factors such as humidity and temperature that can thermally expand or contract a plastic component. To address these three factors in plastic components that contain two attachment points, one of the attachment points can be a round hole and the other attachment point can be a slotted or oblong hole. Such an attachment strategy is often found in plastic chain guides within a chain drive system.

Attaching a plastic component to an IC engine often requires use of a metal component at the attachment points. Often termed compression limiters, these metal components can eliminate the risk of over-stressing the plastic by a fastener during the installation process or eliminate the creep effects of plastic material at the fastener interface which can reduce the clamp load of the fastener. The metal compression limiter can take many forms including a cylinder or a flanged cylinder, with the flange portion interfacing with the fastener. Many engine manufacturers require that the compression limiter is preassembled with the plastic component by the engine component supplier before delivery to the engine assembly plant. This can be accomplished in multiple ways such as overmolding the metal compression limiter within the plastic component; or, in the case of a slotted or oblong hole, it can be retained by design features within the plastic component that allow movement of the compression limiter in order to become aligned with the fastening point on the IC engine during the assembly process.

Packaging space within today's IC engines is very limited and can be a significant design challenge for an engine component. Tool clearance to fasten the component to the engine can add to this packaging challenge. For a plastic engine component, such as a chain guide that is typically long and slender, design features that retain the compression limiter are often located on the portion of the fastener hole that is furthest away from the chain interface to avoid locating any structural irregularities that can reduce the rigidity and/or increase internal stresses such that the load bearing capacity is reduced. This typically requires extra material around the attachment holes furthest away from the load interface which increases the size of the component. In some engine applications the resultant larger size of the chain guide will interfere with adjacent components. A design solution for a plastic chain guide is needed to incorporate a compression limiter retention feature that minimizes the packaging sizes without exceeding critical stress levels.

SUMMARY

A compression limiter retainer arrangement for a chain guide is provided that contains a housing with a first oblong aperture and a second round aperture for mounting to an IC engine. In a first example embodiment, the first oblong aperture receives a first compression limiter and the second round aperture receives a round protruding member, known in the art as a "dowel", located on an IC engine. A first line extends from a first central axis of the first oblong aperture to a second central axis of the second round aperture. The first line is orthogonal to the first central axis and the second central axis. A first radially inward protruding finger is present at a first longitudinal end of the first oblong aperture and a second radially inward protruding finger is present at a second longitudinal end of the first oblong aperture to retain the first compression limiter. A second line extends orthogonally from the first central axis of the first oblong aperture to the center of the radially inward-most portion of the first radially inward protruding finger. A third line extends orthogonally from the first central axis of the first oblong aperture to the center of the radially inward-most portion of the second radially inward protruding finger. A first circle is tangent to the center of the radially inward-most portion of the first finger and the center of the radially inward-most portion of the second finger and defines a fifth retention diameter for the first compression limiter. The location of the first and second radially inward protruding fingers is limited to a −60 to 60 degree angle formed by the second and third lines with the first line.

The first radially inward protruding finger of the first oblong aperture has a first top side, a second bottom side, a radially inward portion, and a radially outward portion. The second radially inward protruding finger of the first oblong aperture has a third top side, a fourth bottom side, a radially inward portion, and a radially outward portion. The respective radially outward portions of each finger are thicker than the radially inward portions.

The first compression limiter has an elongated portion, a radially outward protrusion portion and a through-hole that extends through the elongated portion and the radial outward protrusion portion. The elongated portion of the first compression limiter has a first elongated portion diameter that is typically less than a third minor diameter of the first oblong aperture. The radially outward protrusion portion of the first compression limiter has a first bottom side and a second top side in addition to a second radial outward protrusion diameter that is greater than the fifth retention diameter of the first circle.

Upon installation of the first compression limiter within the first oblong aperture, the first bottom side of the radial outward protrusion portion of the first compression limiter slidably contacts the first and third top sides of the first and second radially inward protruding fingers, respectively, defining a first unretained first compression limiter position. The first and third top sides of the first and second radially inward protruding fingers can have various forms, including curved or angled forms. A downward force applied to the second top side of the radial outward protrusion of the first compression limiter causes the radial inward portion of each of the radially inward protruding fingers to deflect downward and radially outward to allow axial passage of the radially outward protrusion portion of the first compression limiter. This deflection can also provide for an assembly aid if additional clearance is needed for a socket. A retained first compression limiter position is achieved when the second top side of the radial outward protrusion portion of the first compression limiter is axially proximate to the second and fourth bottom sides of the first and second radially inward protruding fingers, respectively, permitting the radially inward portions of each finger to return to their original unloaded positions.

In the retained first compression limiter position, the first compression limiter is movable from a second retained first compression limiter position where the elongated portion of the first compression limiter is engaged with the first longitudinal end of the first oblong aperture, to a third retained first compression limiter position where the elongated portion of the first compression limiter is engaged with the second longitudinal end of the first oblong aperture. In both the second and third retained first compression limiter positions, the second bottom side of the first radially inward protruding finger and the fourth bottom side of the second radially inward protruding fingers overlap the second top side of the radially outward protrusion portion of the first compression limiter to provide axial retention. Additionally, retention of the first compression limiter could also be maintained by only one of the two radially inward protruding fingers in each of the second and third retained first compression limiter positions. Therefore, the previously described overlap would only be present on the corresponding finger that provides retention.

In a second example embodiment of a compression limiter arrangement for a chain guide, an additional third and, if needed, fourth radially inward protruding finger can be added to the first and second longitudinal ends, respectively, of the first oblong aperture. A location of the third and fourth radially inward protruding fingers is determined by additional fourth and fifth lines that extend orthogonally from the first central axis of the first oblong aperture to the center of a radially inward-most portion of each respective finger. The angle formed by the third and fourth lines with the first line is limited to −60 to 60 degrees. The third radially inward protruding finger has a fifth top side, a sixth bottom side, a radially inward portion, and a radially outward portion. The fourth radially inward protruding finger has a seventh top side, an eighth bottom side, a radially inward portion, and a radially outward portion. The first bottom side of the radial outward protrusion portion of the first compression limiter also slidably contacts the fifth and seventh sides of the fourth and fifth radially inward protruding fingers in the first unretained first compression limiter position. Additionally, the second top side of the radial outward protrusion portion of the first compression limiter is axially proximate to the sixth and eighth bottom sides of the third and fourth radially inward protruding fingers in the second and third retained first compression limiter positions; the sixth and eighth bottom sides could also overlap the second top side of the radially outward protrusion portion of the first compression limiter in the second and third retained first compression limiter positions.

In a third example embodiment of a compression limiter arrangement for a chain guide, the second round aperture with a fourth diameter can have a fifth, and, if necessary, a sixth radially inward protruding finger to receive an optional second compression limiter. An elongated portion of the second compression limiter has a sixth elongated portion diameter that is less than a fourth diameter of the second round aperture. The fifth radially inward protruding finger has a ninth top side for receiving the second compression limiter, a tenth bottom side for retaining the second compression limiter, a radially inward portion, and a radially outward portion. The sixth radially inward protruding finger has an eleventh top side for receiving the second compression limiter, a twelfth bottom side for retaining the second compression limiter, a radially inward portion, and a radially outward portion. A location of the fifth and sixth radially inward protruding fingers is determined by additional sixth and seventh lines that extend orthogonally from the first central axis of the first oblong aperture to the center of a radially inward-most portion of each respective finger. The angle formed by the fifth and sixth lines with the first line is limited to −60 to 60 degrees.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE EXAMPLE EMBODIMENTS

Certain terminology is used in the following description for convenience only and is not limiting. A radially inward direction is from an outer radial surface of a component to a central axis or radial center of the component. Conversely, a radially outward direction indicates a direction from the central axis or radial center of the component toward an outer surface. "Axially" refers to directions along a diametric central axis. The words "upper", "lower", "top", "bottom", "inward", "outward", "upward" and "downward" designate directions in the drawings to which reference is made. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Figures 1, 2:
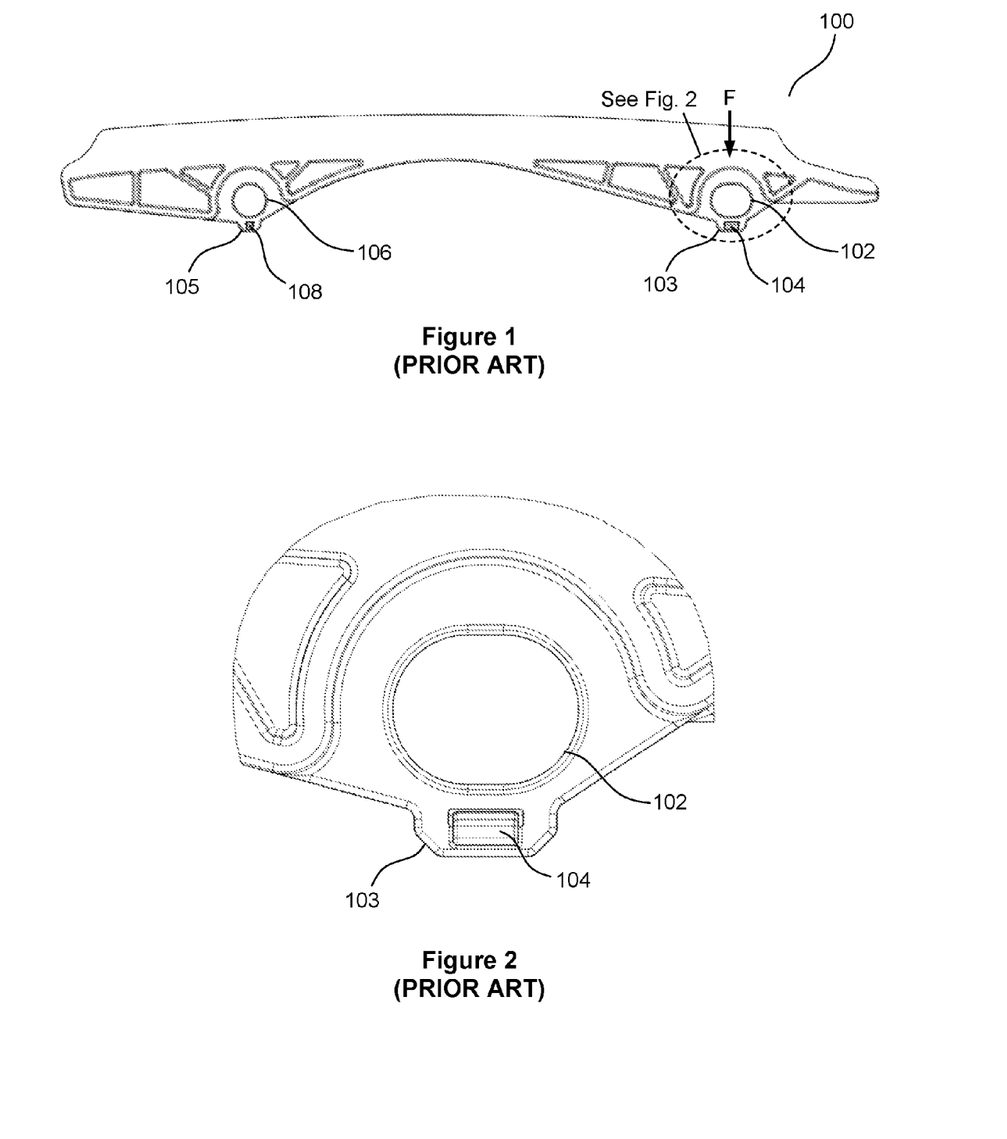
FIG. 1 is a front view of a prior art chain guide.
FIG. 2 is a detailed view taken from FIG. 1.
Figure 3:
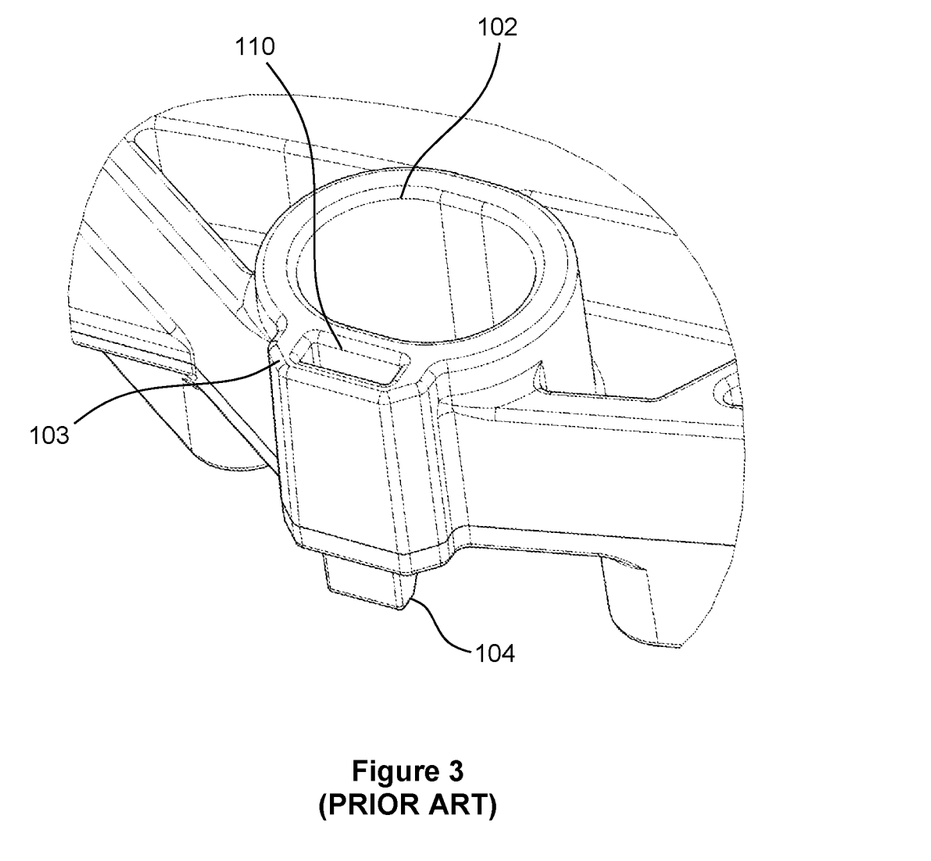
FIG. 3 is a perspective view showing the bottom of the detailed view of FIG. 2.

Referring to FIGS. 1-3, a prior art plastic chain guide 100 is shown with an oblong aperture 102 and a round aperture 106 for attaching the plastic chain guide 100 to an IC engine. A load F is applied to one side of the plastic chain guide 100 by a drive chain (not shown). The oblong aperture 102 and the round aperture 106 have retention fingers 104, 108 for retaining a compression limiter (not shown). It should be noted that protrusions 103, 105 exist to package the retention fingers 104, 108, which add to the packaging space of the plastic chain guide 100. FIG. 2 provides a detailed view of the protrusion 103 present at the proximity of the oblong aperture 102 in order to package the retention finger 104.

Referring now to FIG. 3, which shows a bottom view of the oblong aperture 102 and the respective protrusion 103, a cavity 110 is shown within the protrusion 103. The cavity 110 can be present to comply with proper wall thickness specifications for an injection molded plastic component in addition to providing necessary tooling clearance allowance. For design purposes, it is necessary to locate the cavity 110 away from the loaded portion of the chain guide to avoid a high stress condition and ensure robust performance.

Figure 4:
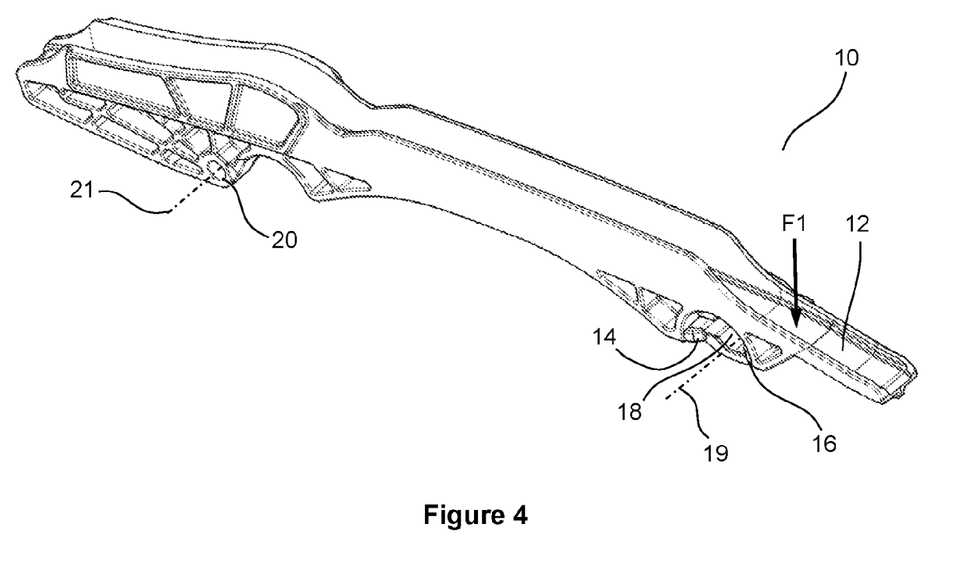
FIG. 4 is a perspective view of a first example embodiment of a compression limiter arrangement for a chain guide.
Figure 5:
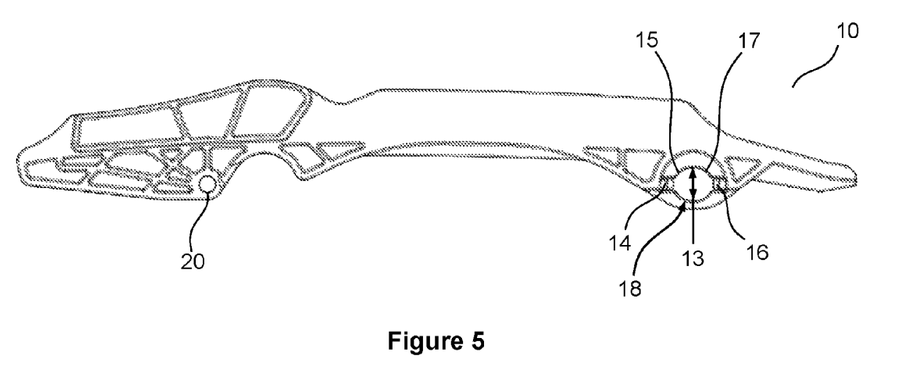
FIG. 5 is a front view of the chain guide of FIG. 4.

Now referring to FIGS. 4 and 5, a first example embodiment of a compression limiter retainer arrangement for a chain guide 10 is shown that contains a first oblong aperture 18 with a first central axis 19 and a second round aperture 20 with second central axis 21. The first oblong aperture 18, includes a first radially inward protruding finger 14 at a first longitudinal end 15 and a second inward protruding finger 16 at a second longitudinal end 17. A third minor diameter 13 defines a smallest span of the first oblong aperture 18. A force F1 is imparted by a drive chain (not shown) on a channel surface 12 of the plastic chain guide 10. The location of the first and second radially inward protruding fingers 14, 16 does not require a localized protrusion as in the prior art chain guide 100 of FIG. 1. Additionally, the location of the first and second radially inward protruding fingers 14, 16 does not negatively impact the stress condition and subsequent long-term performance of the chain guide 10 within an internal combustion engine.

Figure 6A:
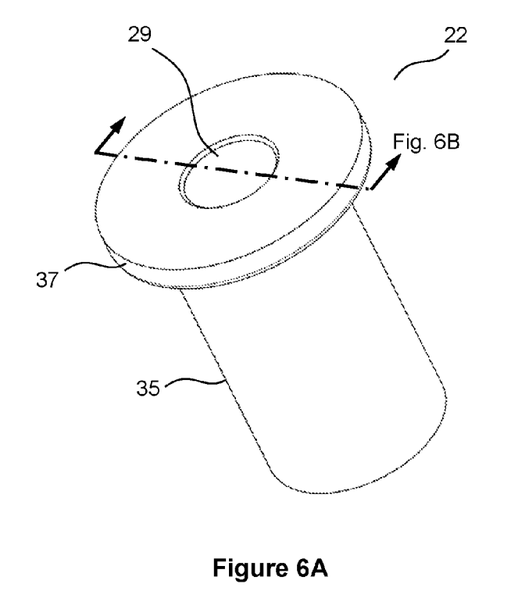
FIG. 6A is a perspective view of a first compression limiter.
Figure 6B:
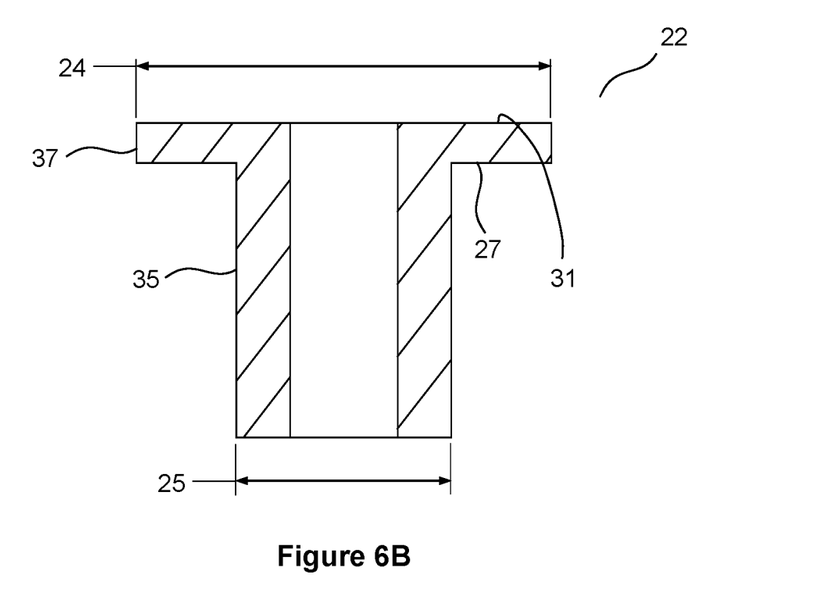
FIG. 6B is a cross-sectional view of the first compression limiter of FIG. 6A.

Referring to FIGS. 6A and 6B, a first compression limiter 22 is shown with an elongated portion 35 that has a first elongated portion diameter 25 and a radial outward protrusion portion 37 that has a second radial outward protrusion diameter 24. A through-hole 29 extends through the elongated portion 35 and the radial outward protrusion portion 37 to receive a fastener (not shown).

Figure 8:
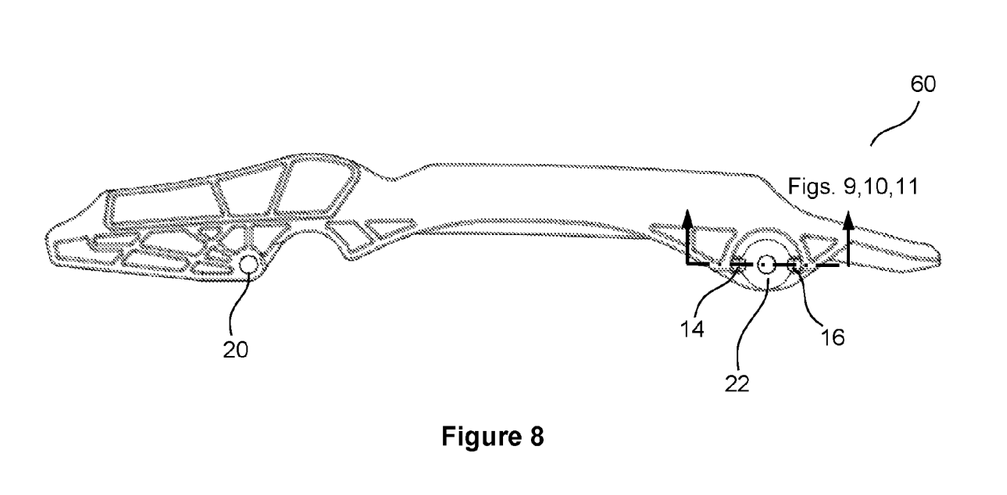
FIG. 8 is a front view of the chain guide of FIG. 4 together with the first compression limiter of FIG. 6A.

FIG. 8 shows a chain guide assembly 60 with the first compression limiter 22 installed within the chain guide 10. To facilitate proper installation of the first compression limiter 22 within the first oblong aperture 18, the first elongated portion diameter 25 of the first compression limiter 22 is typically smaller than the third minor diameter 13 of the first oblong aperture 18. The first compression limiter 22 is retained within the chain guide 10 by either the first, second, or both radially inward protruding fingers 14, 16, yet permitting left or right movement within the first oblong aperture 18 to facilitate alignment of the through-hole 29 with a fastening aperture on an IC engine.

Figure 9:
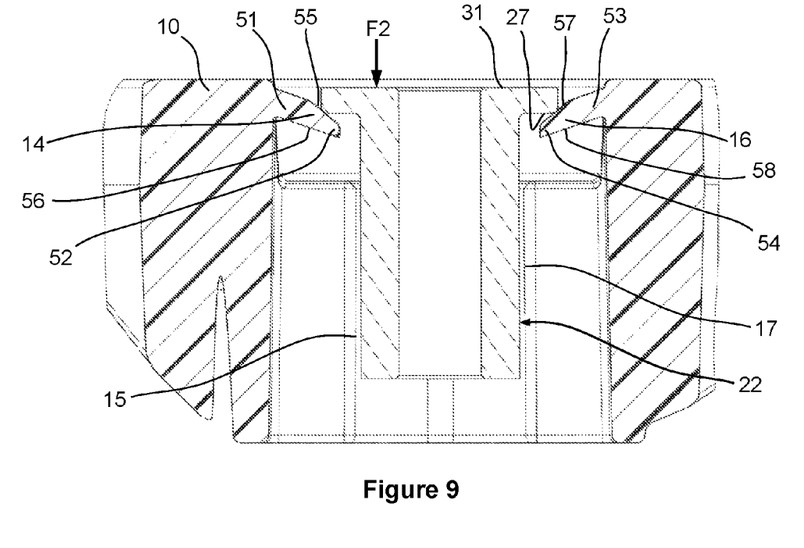
FIG. 9 is a cross-sectional view of the first compression limiter in a first unretained first compression limiter position.

FIG. 9 shows the first compression limiter 22 in a first unretained first compression limiter position within the chain guide 10. The first radially inward protruding finger 14 has a first top side 55 and a second bottom side 56. The second radially inwardly protruding finger 16 has a third top side 57 and a fourth bottom side 58. The first and third top sides 55, 57 of the first and second radially inward protruding fingers 14, 16 can be angled or curved for ease of installation of the first compression limiter 22. Upon installing the first compression limiter 22 within the first oblong aperture 18, a first bottom side 27 of the radial outward protrusion portion 37 is in slidable contact with the first top side 55 of the first radially inward protruding finger 14 and the first top side 57 of the second radially inward protruding finger 16. The first radially inward protruding finger 14 has a radially inward portion 52 and a radially outward portion 51. The second radially inward protruding finger 16 has a radially inward portion 54 and a radially outward portion 53. The radially inward portions 52, 54 are thinner than the radially outward portions 51, 53 of the first and second radially inward protruding fingers 14, 16. Thereby, upon applying an axial force F2 to a second top side 31 of the radial outward protrusion portion 37 of the first compression limiter 22, the first and second radially inward protruding fingers 14, 16 bend downward and radially outward to permit slidable passage of the radially outward protrusion portion 37 of the first compression limiter 22 past the radially inward portions 52, 54 of the respective first and second radially inward protruding fingers 14, 16 to achieve a retained position. In the retained position, the second top side 31 of the radial outward protrusion portion 37 of the first compression limiter 22 is axially proximate to the second and fourth bottom sides 56, 58 of the first and second radially inward protruding fingers 14, 16, permitting movement of the first compression limiter 22 from the first longitudinal end 15 to the second longitudinal end 17 within the first oblong aperture 18.

Figure 10:
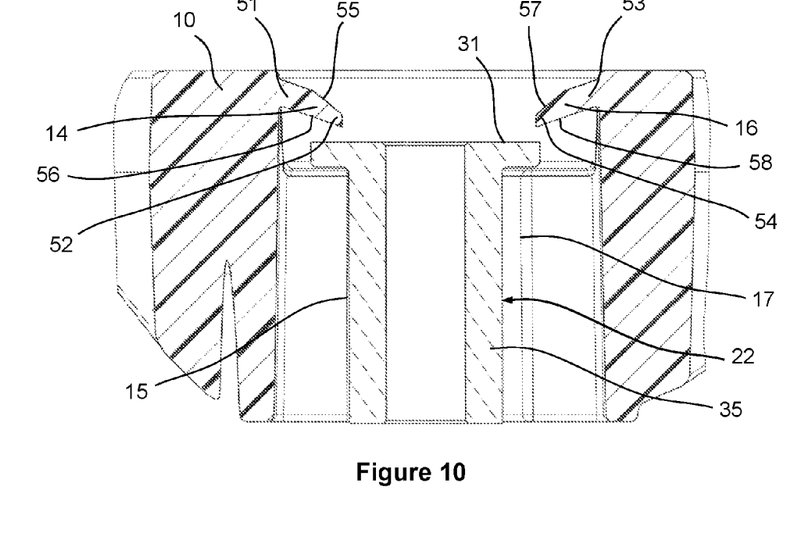
FIG. 10 is a cross-sectional view of the first compression limiter in a second retained first compression limiter position.
Figure 11:
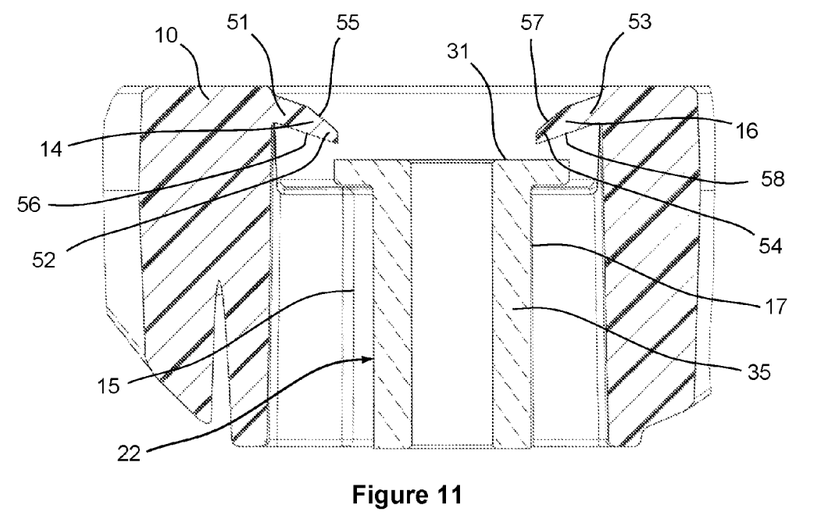
FIG. 11 is a cross-sectional view of the first compression limiter in a third retained first compression limiter position.

FIGS. 10 and 11 show the first compression limiter 22 in two retained positions. In FIG. 10, the first compression limiter 22 is moved to the left of the first oblong aperture 18; therefore, the elongated portion 35 of the compression limiter 22 is in contact with the first longitudinal end 15 of the first oblong aperture 18, defining a second retained first compression limiter position. It should be noted that even though the first compression limiter 22 is furthest away from the second radially inward protruding finger 16, there is still overlap between the radially inward portion 54 of the second radially inward protruding finger 16 and the second top side 31 of the radial outward protrusion portion 37 of the first compression limiter 22. Therefore, the first compression limiter 22 is retained not only by the first radially inward protruding finger 14, but also by the second radially inward protruding finger 16. In FIG. 11, the first compression limiter 22 is moved to the right of the first oblong aperture 18; therefore, the elongated portion 35 of the first compression limiter 22 is in contact with the second longitudinal end 17 of the first oblong aperture 18, defining a third retained first compression limiter position. It should be noted that even though the first compression limiter 22 is furthest away from the first radially inward protruding finger 14, there is still overlap between the radially inward portion 52 of the first radially inward protruding finger 14 and the second top side 31 of the radial outward protrusion portion 37 of the first compression limiter 22. Additionally, retention of the first compression limiter 22 could also be maintained by only one of the two radially inward protruding fingers 14, 16 in each of the second and third retained first compression limiter positions. Therefore, the previously described overlap would only be present on the corresponding finger that provides retention.

Figure 12A:
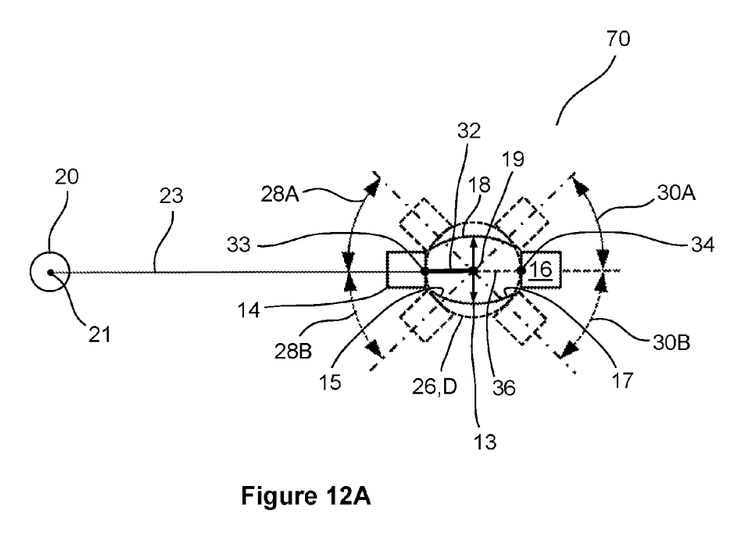
FIG. 12A is a schematic of an attachment scheme for the first example embodiment of a compression limiter retainer arrangement for a chain guide shown in FIG. 4.
Figure 12B:
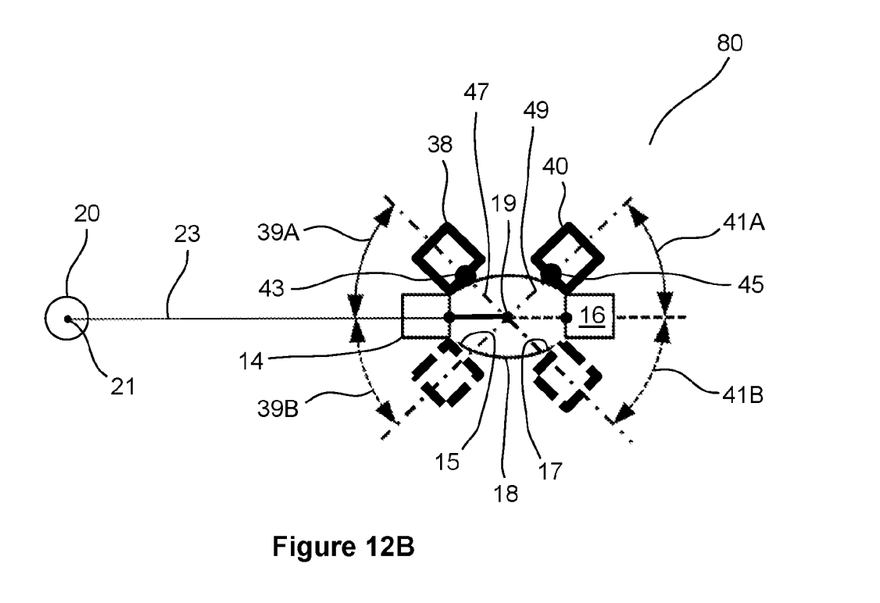
FIG. 12B is a schematic of an attachment scheme for a second example embodiment of a compression limiter arrangement for a chain guide.
Figure 12C:
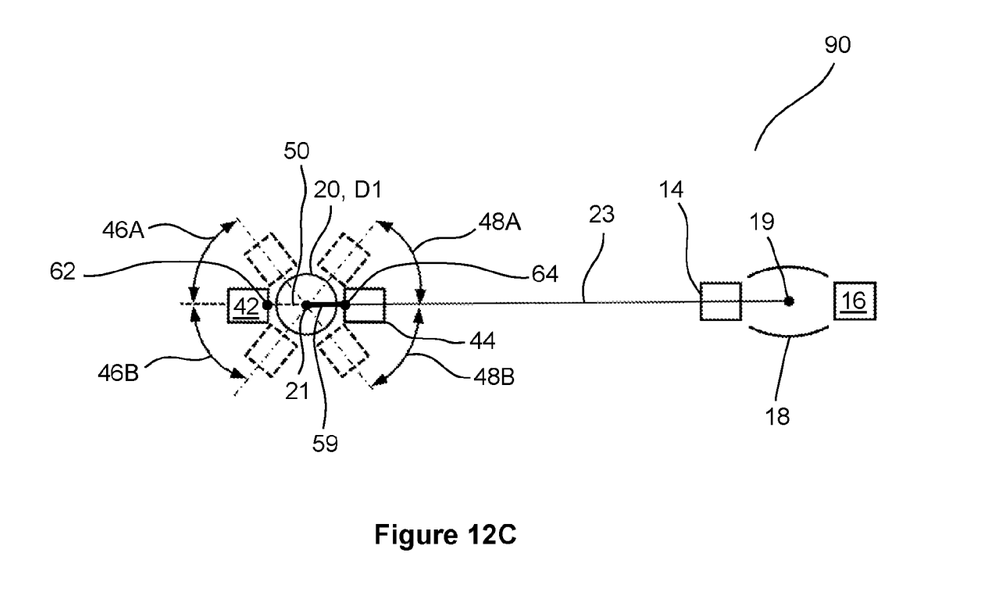
FIG. 12C is a schematic of an attachment scheme for a third example embodiment of a compression limiter arrangement for a chain guide.

FIGS. 12A-12C define: a). an attachment scheme for the first example embodiment of a compression limiter retainer arrangement for a chain guide and additional example embodiments, b). a specified method and range of locating the previously described first and second radially inward protruding fingers 14,16 and additional radially inward protruding fingers contained within further example embodiments, and c). relative sizes of features.

FIG. 12A shows a schematic 70 of an attachment scheme for the first example embodiment of the compression limiter retainer arrangement for a chain guide with the first oblong aperture 18 and the second round aperture 20. The first oblong aperture 18 is for receiving the first compression limiter 22, and the second round aperture 20 is for receiving a round protruding member (not shown), known in the art as a "dowel" that is attached to an IC engine. The first oblong aperture 18 includes the first radially inward protruding finger 14 at the first longitudinal end 15 and the second inward protruding finger 16 at the second longitudinal end 17. The minor diameter 13 defines a smallest span of the oblong aperture 18 and is typically larger than the first elongated portion diameter 25 of the first compression limiter 22 shown in FIG. 6B. For this and further example embodiments, construction of at least three lines and one circle are required to specify locations and define distances between critical features to ensure proper function. A first line 23 extends from the first central axis 19 of the first oblong aperture 18 to the second central axis 21 of the second round aperture 20. The first line 23 is orthogonal to both the first central axis 19 and the second central axis 21. A second line 32 extends orthogonally from the first central axis 19 of the first oblong aperture 18 to the "center" of a radially inward-most portion 33 of the first radially inward protruding finger 14. As a radially inward-most portion can sometimes be a curved surface, the term "center" is used to designate a center point of the radially inward-most curved surface. In other cases, the "center" can merely represent a single point. A third line 36 extends orthogonally from the first central axis 19 of the first oblong aperture 18 to the center of a radially inward-most portion 34 of the second radially inward protruding finger 16. A first circle 26 with a fifth diameter D is tangent to the center of the radially inward-most portion 33 of the first radially inward protruding finger 14 and the center of the radially inward-most portion 34 of the second radially inward protruding finger 16. The fifth diameter D of the first circle 26 is typically smaller than the second radial outward protrusion diameter 24 of the first compression limiter 22. FIG. 12A depicts a condition where the second and third lines 32,36 lie on the first line 23, based on the respective locations of the first and second radially inward protruding fingers 14, 16 shown with solid lines. However, the locations of the first and second radially inward protruding fingers 14, 16 can vary angularly at the first and second longitudinal ends 15, 17 of the first oblong aperture 18 and maintain a minimized packaging condition with acceptable stress levels. This variance can be described in terms of angular positions of the second and third lines 32, 36. The second line 32 can be rotated about the first central axis 19 a positive angle 28A or a negative angle 28B with respect to the first line 23. Likewise, the third line 36 can be rotated about the first central axis 19 a positive angle 30A or a negative angle 30B. The respective rotated positions of the first and second radially inward protruding fingers 14, 16 are shown with broken lines in FIG. 12A. For a minimized packaging condition with acceptable stress levels, a maximum limit for the positive angles 28A, 30A of the second line 32 and the third line 36, respectively, is 60 degrees, while a maximum limit for the negative angles 28B, 30B of the second line 32 and the third line 36, respectively, is 60 degrees.

FIG. 12B shows an attachment scheme 80 for a second example embodiment of the compression limiter retainer arrangement for a chain guide. As in the first example embodiment, the first oblong aperture 18 receives the first compression limiter 22, and the second round aperture 20 receives the round protruding member or dowel (not shown) that is attached to an IC engine. In addition to the previously described first and second radially inward protruding fingers 14, 16, a third radially inward protruding finger 38 at the first longitudinal end 15 of the first oblong aperture 18 and a fourth radially inward protruding finger 40 at the second longitudinal end 17 of the oblong aperture 18 are also included. Within FIG. 12B, the third and fourth radially inward protruding fingers 38, 40 are shown with thick lines to differentiate them from the first and second radially inward protruding fingers 14, 16, yet are similar in structure and function. The third radially inward protruding finger has a fifth top side for receiving the first compression limiter 22, a sixth bottom side for retaining the first compression limiter 22, a radially inward portion, and a radially outward portion. The fourth radially inward protruding finger has a seventh top side for receiving the first compression limiter 22, an eighth bottom side for retaining the first compression limiter 22, a radially inward portion, and a radially outward portion. A fourth line 47 extends orthogonally from the first central axis 19 of the first oblong aperture 18 to the center of a radially inward-most portion 43 of the third radially inward protruding finger 38. A fifth line 49 extends orthogonally from the first central axis 19 of the first oblong aperture 18 to the center of a radially inward-most portion 45 of the fourth radially inward protruding finger 40. To maintain a minimum packaging condition with acceptable stress levels, the locations of the third and fourth radially inward protruding fingers 38, 40 can vary angularly at the first and second longitudinal ends 15, 17 of the first oblong aperture 18. This variance can be described in terms of the fourth and fifth lines 47, 49. The fourth line 47 can be rotated about the first central axis 19 a positive angle 39A or a negative angle 39B with respect to the first line 23. Likewise, the fifth line 49 can be rotated about the first central axis 19 a positive angle 41A or a negative angle 41B. The respective rotated positions of the third and fourth radially inward protruding fingers 38, 40 are shown with thick broken lines in FIG. 12B. For a minimized packaging condition with acceptable stress levels, a maximum limit for the positive angles 39A, 41A of the fourth line 47 and the fifth line 49, respectively, is 60 degrees, while a maximum limit for the negative angles 39B, 41B of the fourth line 47 and the fifth line 49, respectively, is 60 degrees.

Figure 7A:
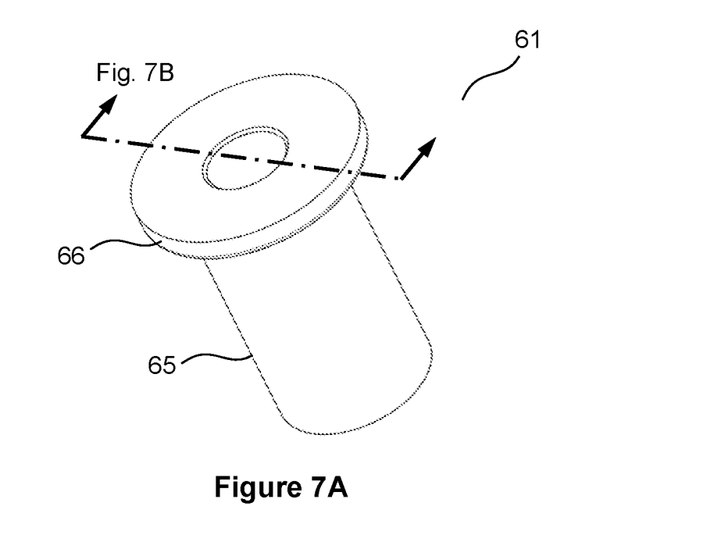
FIG. 7A is a perspective view of a second compression limiter.
Figure 7B:
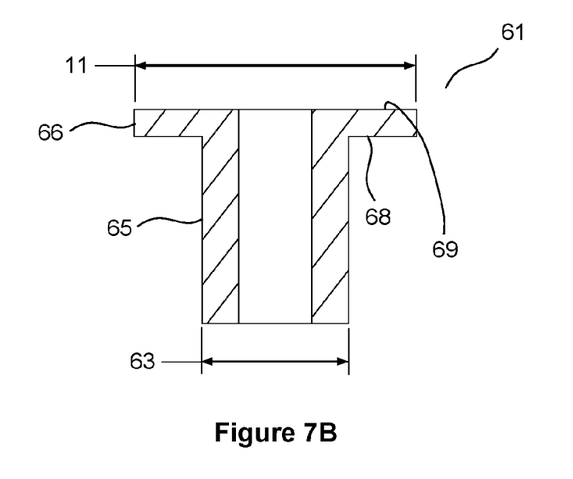
FIG. 7B is a cross-sectional view of the second compression limiter of FIG. 7A.

FIG. 12C shows an attachment scheme 90 for a third example embodiment of a compression limiter retainer arrangement for a chain guide. In this example embodiment, the first oblong aperture 18 receives the first compression limiter 22, and the second round aperture 20 with a fourth diameter D1 receives a second compression limiter 61 shown in FIGS. 7A and 7B. The second compression limiter 61 has an elongated portion 65 with a sixth elongated portion diameter 63 and a radial outward protrusion portion 66 with a seventh radial outward protrusion diameter 11. The sixth elongated portion diameter 63 is typically less than the fourth diameter D1 of the second round aperture 20. In this variation, a fifth radially inward protruding finger 42 and a sixth radially inward protruding finger 44 are proximate to the second round aperture 20 to retain the second compression limiter 61. It may be possible that only the fifth radially inward protruding finger 42 is needed to retain the second compression limiter 61. A sixth line 50 extends orthogonally from the second central axis 21 of the second round aperture 20 to the center of a radially inward-most portion 62 of the fifth radially inward protruding finger 42. A seventh line 59 extends orthogonally from the second central axis 21 of the second round aperture 20 to the center of a radially inward-most portion 64 of the sixth radially inward protruding finger 44. FIG. 12C depicts a condition where the sixth and seventh lines 50, 59 lie on the first line 23, based on the respective locations of the fifth and sixth radially inward protruding fingers 42, 44 shown with solid lines. However, the locations of the fifth and sixth radially inward protruding fingers 42, 44 can vary angularly and still maintain an acceptable stress and minimized packaging condition. This variance can be described in terms of the angular positions of the sixth and seventh lines 50, 59. The sixth line 50 can be rotated about the second central axis 21 a positive angle 46A or a negative angle 46B with respect to the first line 23. Likewise, the seventh line 59 can be rotated about the second central axis 21 a positive angle 48A or a negative angle 48B. The respective rotated positions of the fifth and sixth radially inward protruding fingers 42, 44 are shown with broken lines in FIG. 12C. For an acceptable stress and minimized packaging condition, a maximum limit for the positive angles 46A, 48A of the sixth line 50 and the seventh line 59, respectively, is 60 degrees, while a maximum limit for the negative angles 46B, 48B of the sixth line 50 and the seventh line 59, respectively, is 60 degrees.

Having thus described various embodiments of the present compression limiter retainer arrangement for a chain guide in detail, it is to be appreciated and will be apparent to those skilled in the art that many physical changes, only a few of which are exemplified in the detailed description above, could be made without altering the inventive concepts and principles embodied therein. For example, either the first compression limiter 22 or the second compression limiter 61 could potentially be applied to both the first oblong aperture 18 and the second round aperture 20. Furthermore, either the first or second compression limiters 22, 61 can alternatively have any other suitable shape other than what is shown in respective FIGS. 6A, 6B and 7A, 7B to perform the role of a compression limiter. The present embodiments are therefore to be considered in all respects as illustrative and not restrictive, the scope of the disclosure being indicated by the appended claims rather than by the foregoing description, and all changes which come within the meaning and range of equivalency of the claims are therefore to be embraced therein.

What is claimed is:

1. A compression limiter retainer arrangement for a chain guide comprising:
    a housing with a first oblong aperture for receiving a first compression limiter and a second round aperture, the housing including:
        a first radially inward protruding finger proximate to a first longitudinal end of the first oblong aperture, the finger having a first top side for slidably receiving the first compression limiter, and a second bottom side for retaining the first compression limiter;
        a second radially inward protruding finger proximate to a second longitudinal end of the first oblong aperture, the finger having a third top side for slidably receiving the first compression limiter, and a fourth bottom side for retaining the first compression limiter;
        a first line from a first central axis of the first oblong aperture to a second central axis of the second round aperture;
        a second line from the center of a radially inward-most portion of the first radially inward protruding finger to the first central axis of the first oblong aperture; and
        a third line from the center of a radially inward-most portion of the second radially inward protruding finger to the first central axis of the first oblong aperture;
        wherein, the first line is orthogonal to the first central axis and the second central axis, and the second and third lines are orthogonal to the first central axis and form an angle with the first line, the angle ranging from −60 to 60 degrees.

2. The compression limiter retainer arrangement for a chain guide of claim 1, wherein the first top side of the first radially inward protruding finger and the third top side of the second radially inward protruding finger are angled.

3. The compression limiter retainer arrangement for a chain guide of claim 1, wherein the first top side of the first radially inward protruding finger and the third top side of the second radially inward protruding finger are curved.

4. The compression limiter retainer arrangement for a chain guide of claim 1, wherein the first radially inward protruding finger and the second radially inward protruding finger have a radially inward portion and a radially outward portion.

5. The compression limiter retainer arrangement for a chain guide of claim 4, wherein the radially outward portion is thicker than the radially inward portion.

6. The compression limiter retainer arrangement for a chain guide of claim 1, further comprising:
   a third radially inward protruding finger proximate to the first longitudinal end of the first oblong aperture, the finger having a fifth top side for slidably receiving the first compression limiter, and a sixth bottom side for retaining the first compression limiter; and,
   a fourth line from the center of a radially inward-most portion of the third radially inward protruding finger to the first central axis of the first oblong aperture;
   wherein, the fourth line is orthogonal to the first central axis and forms an angle with the first line, the angle ranging from −60 to 60 degrees.

7. The compression limiter retainer arrangement for a chain guide of claim 6, further comprising:
   a fourth radially inward protruding finger proximate to the second longitudinal end of the first oblong aperture, the finger having a seventh top side for slidably receiving the first compression limiter, and an eighth bottom side for retaining the first compression limiter; and,
   a fifth line from the center of a radially inward-most portion of the fourth radially inward protruding finger to the first central axis of the first oblong aperture;
   wherein, the fifth line is orthogonal to the first central axis and forms an angle with the first line, the angle ranging from −60 to 60 degrees.

8. The compression limiter retainer arrangement for a chain guide of claim 1, further comprising:
   a fifth radially inward protruding finger proximate to the second round aperture, the finger having a ninth top side for slidably receiving a second compression limiter, and a tenth bottom side for retaining the second compression limiter; and
   a sixth line from the center of a radially inward-most portion of the fifth radially inward protruding finger to the second central axis of the second round aperture;
   wherein the sixth line is orthogonal to the second central axis and forms an angle with the first line, the angle ranging from −60 to 60 degrees.

9. The compression limiter retainer arrangement for a chain guide of claim 8, further comprising:
   a sixth radially inward protruding finger proximate to the second round aperture, the finger having an eleventh top side for slidably receiving a second compression limiter, and a twelfth bottom side for retaining the second compression limiter; and,
   a seventh line from the center of a radially inward-most portion of the sixth radially inward protruding finger to the second central axis of the second round aperture, wherein the seventh line is orthogonal to the second central axis and forms an angle with the first line, the angle ranging from −60 to 60 degrees.

10. The compression limiter retainer arrangement for a chain guide of claim 1, wherein the housing is made of plastic.

11. A chain guide assembly comprising:
   a first compression limiter with an elongated portion with a first elongated portion diameter and a radial outward protrusion portion with a second radial outward protrusion diameter;
   a housing including:
      a first oblong aperture with a first longitudinal end and a second longitudinal end, and a third minor diameter for receiving the first compression limiter;
      a second round aperture with a fourth diameter;
      a first radially inward protruding finger proximate to the first longitudinal end of the oblong aperture, the finger having a first top side for slidably receiving the first compression limiter, and a second bottom side for retaining the first compression limiter;
      a second radially inward protruding finger proximate to the second longitudinal end of the oblong aperture, the finger having a third top side for slidably receiving the first compression limiter, and a fourth bottom side for retaining the first compression limiter;
      a first line from a first central axis of the first oblong aperture to a second central axis of the second round aperture;
      a second line from the center of a radially inward-most portion of the first protruding finger to the first central axis of the first oblong aperture;
      a third line from the center of a radially inward-most portion of the second radially inward protruding finger to the first central axis of the first oblong aperture; and,
      a first circle with a fifth retention diameter tangent to the center of the radially inward-most portion of the first radially inward protruding finger and the center of the radially inward-most portion of the second inward protruding finger;
      wherein, the first line is orthogonal to the first central axis and the second central axis, and the second and third lines are orthogonal to the first central axis and form an angle with the first line, the angle ranging from −60 to 60 degrees.

12. The chain guide assembly of claim 11, wherein the fifth retention diameter is less than the second radial outward protrusion diameter, and the third minor diameter is greater than the first elongated portion diameter.

13. The chain guide assembly of claim 11, further comprising:
   a third radially inward protruding finger proximate to the first longitudinal end of the first oblong aperture, the finger having a fifth top side for slidably receiving the first compression limiter and a sixth bottom side for retaining the first compression limiter; and,
   a fourth line from the center of a radially inward-most portion of the third radially inward protruding finger to the first central axis of the first oblong aperture;
   wherein the fourth line is orthogonal to the first central axis and forms an angle with the first line, the angle ranging from −60 to 60 degrees.

14. The chain guide assembly of claim 13, further comprising:
   a fourth radially inward protruding finger proximate to the second longitudinal end of the first oblong aperture, the finger having a seventh top side for slidably receiving the first compression limiter and an eighth bottom side for retaining the first compression limiter; and, a fifth line from the center of a radially inward-most portion of the fourth radially inward protruding finger to the first central axis of the first oblong aperture;

wherein the fifth line is orthogonal to the first central axis and forms an angle with the first line, the angle ranging from −60 to 60 degrees.

15. The chain guide assembly of claim 11, further comprising:
    a second compression limiter with a sixth elongated portion diameter;
    a fifth radially inward protruding finger proximate to the second round aperture, the finger having a ninth top side for slidably receiving the second compression limiter, and a tenth bottom side for retaining the second compression limiter; and
    a sixth line from the center of a radially inward-most portion of the fifth radially inward protruding finger to the second central axis of the second round aperture;
    wherein the sixth line is orthogonal to the second central axis and forms an angle with the first line, the angle ranging from −60 to 60 degrees.

16. The chain guide assembly of claim 15, further comprising:
    a sixth radially inward protruding finger, proximate to the second round aperture, the finger having an eleventh top side for slidably receiving the second compression limiter, and a twelfth bottom side for retaining the second compression limiter; and,
    a seventh line from the center of a radially inward-most portion of the sixth radially inward protruding finger to the second central axis of the second round aperture;
    wherein the seventh line is orthogonal to the second central axis and forms an angle with the first line, the angle ranging from −60 to 60 degrees.

17. The chain guide assembly of claim 15, wherein the fourth diameter is greater than the sixth elongated portion diameter.

18. The chain guide assembly of claim 12, including:
    a first unretained first compression limiter position with a first bottom side of the radially outward protrusion portion of the first compression limiter engaged with the first top side of the first radially inward protruding finger and the third top side of the second radially inward protruding finger;
    a second retained first compression limiter position with a second top side of the radially outward protrusion of the first compression limiter axially proximate to the second bottom side of the first radially inward protruding finger and the fourth bottom side of the second radially inward protruding finger, and the elongated portion of the first compression limiter engaged with the first longitudinal end of the oblong aperture; and,
    a third retained first compression limiter position with the second top side of the radially outward protrusion of the first compression limiter axially proximate to the second bottom side of the first radially inward protruding finger and the fourth bottom side of the second radially inward protruding finger, and the elongated portion of the first compression limiter engaged with the second longitudinal end of the oblong aperture.

19. The chain guide assembly of claim 18, wherein the first radially inward protruding finger and the second radially inward protruding finger overlap the second top side of the radially outward protrusion portion of the first compression limiter in the second retained first compression limiter position and the third retained first compression limiter position.

\* \* \* \* \*